United States Patent [19]

Omi et al.

[11] Patent Number: 5,043,003

[45] Date of Patent: Aug. 27, 1991

[54] PROCESS FOR PRODUCING GLASS DOPED WITH DISPERSED MIROCRYSTALLITES

[75] Inventors: Shigeaki Omi, Kawagoe; Shuji Yoshida, Odawara; Yoshiyuki Asahara, Nishitama, all of Japan

[73] Assignee: Hoya Corporation, Tokyo, Japan

[21] Appl. No.: 489,108

[22] Filed: Mar. 6, 1990

[30] Foreign Application Priority Data

Mar. 10, 1989 [JP] Japan ................................ 1-58467

[51] Int. Cl.$^5$ .............................................. C03C 21/00
[52] U.S. Cl. .......................................... 65/31; 65/3.11; 65/30.13; 65/DIG. 15; 501/17; 501/32
[58] Field of Search ................. 65/3.11, 31, 30.13, 65/33, DIG 15; 501/17, 32

[56] References Cited

U.S. PATENT DOCUMENTS

| | | | |
|---|---|---|---|
| 3,798,014 | 3/1974 | Bondarev et al. | 65/33 |
| 3,804,608 | 4/1974 | Gaskell et al. | 65/33 |
| 3,809,542 | 5/1974 | Lythgoe et al. | 65/33 |
| 4,160,655 | 7/1979 | Kingsbury et al. | 65/33 X |
| 4,244,723 | 1/1981 | Grossman | 65/33 |

OTHER PUBLICATIONS

American Optical Soc. of Am., vol. 73, #5, May 1983, J. Am. Opt. Soc., pp. 647–653, Jain et al.

*Primary Examiner*—Robert L. Lindsay
*Assistant Examiner*—Robert L. Lindsay
*Attorney, Agent, or Firm*—Nixon & Vanderhye

[57] ABSTRACT

The present invention relates to a process for producing a glass doped with dispersed microcrystallites, said process comprises:

a first step of cooling a glas melt comprising a component to become a glass matrix and a component to become microcrystallites dispersed in said matrix, to a temperature T which is not higher than the flow point of the glass but not lower than the sag point of the glass, and a second step of maintaining the cooled glass at the temperature T to precipitate microcrytallites in the matrix.

The glass doped with dispersed microcrystallites produced is used as a material for sharp cut filter, a material for infrared-transmitting filter, a nonlinear optical material, etc.

8 Claims, 2 Drawing Sheets

PROCESS FOR PRODUCING GLASS DOPED WITH DISPERSED MIROCRYSTALLITES

BACKGROUND OF THE INVENTION (1) Field of the Invention

The present invention relates to a process for producing a glass doped with dispersed microcrystallites, which glass is used as a material for sharp cut filter, a material for infrared-transmitting filter, a nonlinear optical material, etc. More particularly, the present invention relates to a process for producing a glass doped with dispersed microcrystallites of $CdS_xSe_{1-x}$ or $CdS_xSe_{1-x-y}Te_y$.

(2) Description of the Prior Art

A glass doped with dispersed microcrystallites, comprising a matrix and microcrystallites of $CdS_xSe_{1-x}$ ($0<x<1$) dispersed in the matrix, is in use as a material for sharp cut filter having an absorption end at the longer wavelength range of visible light. A glass doped with dispersed microcrystallites, comprising a matrix and microcrystallites of $CdS_xSe_{1-x-y}Te_y$ ($0<x<1$, $0<y<1$, $0<x+y<1$) dispersed in the matrix is in use as a material for infrared-transmitting filter. In recent years, the glass doped with dispersed microcrystallites, comprising a matrix and microcrystallites of $CdS_xSe_{1-x}$ dispersed in the matrix has been found to show a third-order optical nonlinearity 8 J. Opt. Soc., Am. Vol 73, No. 5, pp. 647-653 (1983)] and has drawn attention as a nonlinear optical material for optical switch, optical computer, etc.

For producing such a glass doped with dispersed microcrystallites, there has conventionally been adopted a process which comprises melting a mixture of a glass or its materials both to become a matrix and a material to become microcrystallites dispersed in the matrix, to obtain a glass melt; cooling the glass melt to room temperature to obtain a glass comprising a matrix and ions of the elements to constitute microcrystallites, dissolved in the matrix; heating the glass to a given temperature; and maintaining the glass at that temperature to heat-treat the glass to precipitate microcrystallites in the matrix.

When a glass doped with dispersed microcrystallites is produced according to the conventional process, however, the precipitation of microcrystallites begins already at the step of heating the glass obtained by cooling the glass melt to room temperature, to a given temperature in order to precipitate microcrystallites. The microcrystallites precipitated at this step tend to cause secondary growth, i.e. a phenomenon that the elements constituting those portions of the precipitated microcrystallites having relatively small diameters are ionized and diffused into the matrix, and deposit on the microcrystallites of relatively large diameters to grow them. Such secondary growth gives rise to structural defect in precipitated microcrystallites; contamination of microcrystallites with impurities (e.g. matrix component); and structural fluctuation, whereby the precipitated microcrystallites become nonuniform.

Therefore, when a thin sharp cut filter or a thin infrared-transmitting filter is obtained from the glass doped with dispersed microcrystallites produced according to the conventional process, the spectral transmittance curve of the filter tends to be not sharp in the rise of spectral transmittance and be large in transitional interval. Accordingly, it has been difficult to obtain from said glass a sharp cut filter or an infrared-transmitting filter, both having good spectral properties.

SUMMARY OF THE INVENTION

Hence, the object of the present invention is to provide a process for producing a glass doped with dispersed microcrysallites, which process can suppress the secondary growth of microcrystallites at the time of their precipitation and thereby enables the production of a glass doped with dispersed microcrystallites, showing an excellent spectral property when used in a thin sharp cut filter or a thin infrared-transmitting filter.

The present invention has been made in order to achieve the above object. According to the present invention, there is provided a process for producing a glass doped with dispersed microcrystallites, which comprises:

a first step of cooling a glass melt comprising a component to become a glass matrix and a component to become microcrystallites dispersed in said matrix, to a temperature T which is not higher than the flow point of the glass but not lower than the sag point of the glass, and a second step of maintaining the cooled glass at the temperature T to precipitate microcrystallites in the matrix.

DETAILED DESCRIPTION OF THE INVENTION

Figure 1:
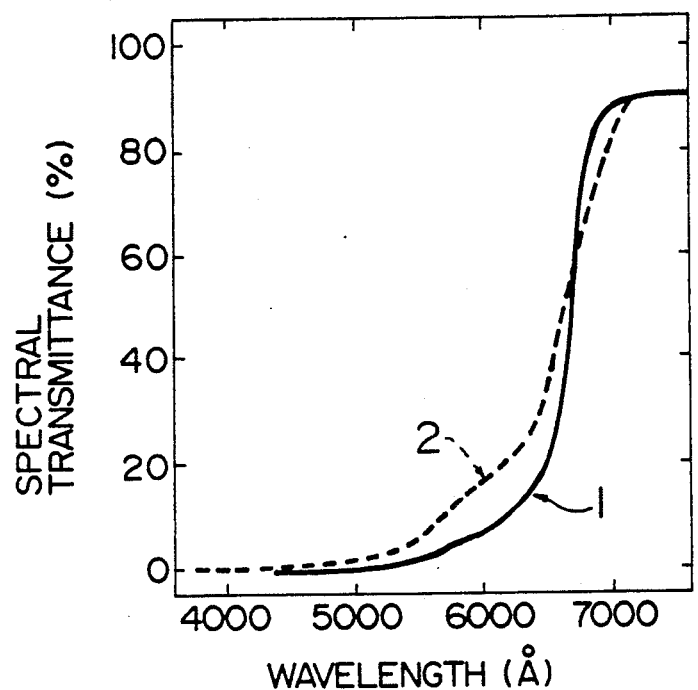
FIG. 1 is a graph showing the spectral transmittance curves of the glasses doped with dispersed $CdS_xSe_{1-x}$ microcrystallites, obtained in Example 1 and Comparative Example 1.

In the present invention, the starting materials for the matrix component to be produced are preferably neutral or reducing compounds which do not substantially oxidize the microcrystallites component, such as oxides (e.g. $SiO_2$, $B_2O_3$, $ZnO$), carbonates (e.g. $Na_2CO_3$, $K_2CO_3$), acetates (e.g. $CH_3COONa$, $CH_3COOK$), hydroxides (e.g. $H_3BO_3$), glasses and the like, because the micrystallites component, when oxidized, becomes soluble in the matrix component and is not precipitated as microcrystallites.

The starting materials for the microcrystallites are preferably metals or metal compounds which, when melted, dissolve in the form of ions in the glass melt, such as Cd, S, Se, Te, CdS, CdSe, CdTe and the like.

As the starting materials for the glass melt, there may be used a glass obtained by melting the starting material for the matrix component and the starting material for the microcrystallites.

The atmosphere used for obtaining a glass melt is preferably a neutral atmosphere such as nitrogen, argon, helium or the like, or a reducing atmosphere such as ammonia or the like.

In the first step, the cooling rate used for cooling the glass melt to a temperature T which is not higher than the flow point of the glass but not lower than the sag point of the glass, is such that the Cd, S, Se and Te dissolving in the form of ions in the glass melt are not precipitated as crystals. Incidentally, the flow point of the glass refers to a temperature at which the viscosity of the glass becomes $1 \times 10^5$ poises, and the sag point of the glass refers to a temperature at which the viscosity of the glass becomes $1 \times 10^{11}$ poises.

The first step of cooling the glass melt to a temperature T and the second step of maintaining the glass obtained in the first step, at the temperature T can be effected in the heat resistant vessel which has been used to obtain the glass melt, without taking out the obtained glass melt, or can be effected by transferring the glass melt from the heat-resistant vessel onto a metal or carbon both not reactive with the glass melt.

The time for maintaining the cooled glass at the temperature T in the second step is 5 minutes to 120 hours. When the time is shorter than 5 minutes, the precipitation of microcrystallites is insufficient and is not preferable in practical application. When the time exceeds 120 hours, there occur no more changes in diameters and densities of microcrystallites precipitated, as well as in optical properties of produced glass doped with dispersed microcrystallites.

In the present invention, when the temperature to which the glass melt is cooled and at which the cooled glass is maintained, is higher than the flow point of the glass, the cooled glass causes deformation, which is not preferable in practical application. When said temperature is lower than the sag point of the glass, the composition of the microcrystallites precipitated differs, which is not preferable, either, in practical application. When said temperature is selected so as not to be higher than a temperature at which the viscosity of the glass is $4 \times 10^7$ poises and not to be lower than the sag point of the glass, the diameters of the microcrystallites precipitated are small, reducing light scattering; therefore, it is particularly preferable to select the temperature T as above.

When the glass melt is quenched to the temperature T at a high rate of at least about 10° C./sec with drawing by a twin-roller quenching process, a single-roller quenching process, a press quenching process, a float process, a lift process or the like and the quenched glass is maintained at the temperature T, there can be obtained a glass doped with dispersed microcrystallites, having an optically smooth surface, without applying any surface treatment. In this case, there can be obtained, without applying any surface treatment, a thin glass sheet doped with dispersed microcrystallites, having an optically smooth surface.

Thus, by cooling the glass melt to the temperature T and subsequently maintaining the cooled glass at the temperature T, there can be obtained a glass doped with dispersed microcrystallites, wherein no secondary growth of microcrystallites is seen and microcrystallites having diameters of approximately 1,000 angstroms or less are dispersed.

In the present invention, the glass melt is cooled to a temperature T which is not higher than the flow point of the glass but not lower than the sag point of the glass, and the cooled glass is maintained at the temperature T to precipitate microcrystallites in the glass matrix. These microcrystallites grow in proportion to the one-half power of the maintenance time of the cooled glass at a stage that the ions of the elements constituting the microcrystallites remain in the glass matrix; however, when the maintenance time of the cooled glass exceeds 120 hours, no more change of particle diameters is seen and the diameters are substantially not more than 1,000 angstroms. As is understood from this fact, the microcrystallites precipitated in the process of the present invention grow only in the form of primary growth wherein the ions of the elements constituting the microcrystallites, dissolving in the matrix deposit on the surfaces of crystal nuclei and the growth of microcrystallites is brought about thereby.

Accordingly, when a glass doped with dispersed microcrystallites is produced according to the process of the present invention, the formed microcrystallites are free from structural defect, contamination with impurities and structural fluctuation. Therefore, the present process can produce a glass doped with dispersed microcrystallites, showing an excellent spectral property when made into a thin sharp cut filter or a thin infrared-transmitting filter and also showing a good nonlinear optical property when used as a nonlinear optical material.

The present invention is specifically described below by way of Examples and Drawings.

EXAMPLE 1

In a refractory crucible were placed (a) 100 parts by weight of a glass powder consisting mainly of $SiO_2$, $Na_2O$, $K_2O$ and ZnO which was to become a matrix of a glass and (b) a mixture consisting of 0.5 part by weight of CdS and 1.0 part by weight of CdSe which was to become microcrystallites dispersed in the matrix; they were heated for 2 hours in a nitrogen atmosphere of 1,300° C. with stirring, to obtain a glass melt; the glass melt was casted on a steel plate heated at 720° C. to cool it. (First step) This glass had a flow point of 820° C. and a sag point of 640° C.

The glass obtained in the first step by cooling the glass melt to 720° C. was maintained for 2 hours at this temperature in the atmosphere to precipitate microcrystallites of $CdS_xSe_{1-x}$ ($0<x<1$) in the matrix. (Second step)

The glass after the second step was annealed to room temperature to obtain a glass doped with dispersed microcrystallites of $CdS_xSe_{1-x}$.

The glass was measured for the size of the $CdS_xSe_{1-x}$ microcrystallites dispersed in the matrix by X-ray diffractometry. The average particle diameter of $CdS_xSe_{1-x}$ microcrystallites was 60 angstroms.

The above glass doped with dispersed microcrystallites of $CdS_xSe_{1-x}$ was subjected to optical polishing to a thickness of 0.5 mm and measured for spectral transmittance. The spectral transmittance, as shown by the solid line 1 of FIG. 1, was sharp in the rise and small in the transitional interval. Accordingly, the glass was confirmed to have an excellent spectral property as a material for sharp cut filter.

Figure 2:
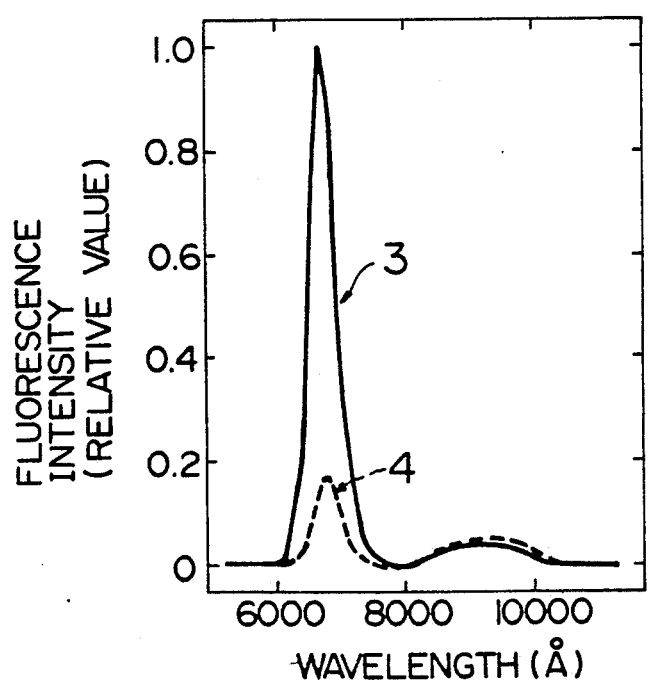
FIG. 2 is a graph showing the fluorescence spectral intensities seen when the glasses doped with dispersed $CdS_xSe_{l-x}$ microcrystallites, obtained in Example 1 and Comparative Example 1 were irradiated with an argon laser beam having a wavelength of 4,880 angstroms.

The optically polished glass having thickness of 0.5 mm was also measured for fluorescence spectral intensity when excited by an argon laser beam having a wavelength of 4,880 angstroms. The fluorescence intensity, as shown by the solid line 3 of FIG. 2, was very large at a wavelength of about 6,800 angstroms. This fluorescence was generated by an electron-hole emission believed to have a connection with a nonlinear optical phenomenon; accordingly, the glass doped with dispersed microcrystallites of $CdS_xSe_{1-x}$, obtained in this Example was confirmed to have an excellent optical nonlinearity.

COMPARATIVE EXAMPLE 1

A glass melt was obtained in the same manner as in Example 1. The glass melt was casted on a steel plate maintained at room temperature to cool it.

The resulting glass was heated from room temperature to 720° C. in 5 minutes in the atmosphere, maintained at this temperature for 2 hours to precipitate $CdS_xSe_{1-x}$ microcrystallites, and annealed to room temperature to obtain a glass doped with dispersed microcrystallites of $CdS_xSe_{1-x}$.

The glass was measured for spectral transmittance in the same manner as in Example 1. The spectral transmittance, as shown by the broken line 2 of FIG. 1, was mild (not sharp) in the rise and large in the transitional interval, as compared with the spectral transmittance of the glass doped with dispersed microcrysallites of $CdS_xSe_{1-x}$, obtained in Example 1.

The glass was also measured for fluorescence spectral intensity in the same manner as in Example 1. The fluorescence intensity, as shown by the broken line 4 of FIG. 2, was very small at a wavelength of about 6,800 angstroms, as compared with the fluorescence intensity of the glass doped with dispersed microcrystallites of $CdS_xSe_{1-x}$, obtained in Example 1.

EXAMPLES 2-4

Three glasses each doped with dispersed microcrystallites of $CdS_xSe_{1-x}$ were obtained in the same manner as in Example 1 except that the steel plate temperature in the first step and the maintenance temperature in the second step were changed to 640° C. and 2 hours (Example 2), 660° C. and 2 hours (Example 3), and 680° C. and 16 hours (Example 4).

Each glass was measured for the size of the $CdS_xSe_{1-x}$ microcrystallites dispersed in the glass, in the same manner as in Example 1. The average particle diameter of $CdS_xSe_{1-x}$ was 30 angstroms in the glass of Example 2, 40 angstroms in the glass of Example 3 and 45 angstroms in the glass of Example 4.

Each glass was also measured for spectral transmittance and fluorescence spectral intensity in the same manner as in Example 1. The results were the same as in Example 1, and each glass was confirmed to have an excellent spectral property as a material for sharp cut filter and also an excellent optical nonlinearity.

EXAMPLE 5

In a refractory crucible were placed (a) 100 parts by weight of a glass powder consisting mainly of $SiO_2$, $Na_2O$, $K_2O$ and $ZnO$ which was to become a matrix of a glass to be produced and (b) a mixture consisting of 0.3 part by weight of CdS, 1.0 part by weight of CdSe and 0.2 part by weight of CdTe which was to become microcrystallites dispersed in the matrix; they were heated for 2 hours in a nitrogen atmosphere of 1,300° C. with stirring, to obtain a glass melt; the glass melt was casted on a steel plate heated at 680° C. to cool it. (First step) This glass had a flow point of 800° C. and a sag point of 630° C.

The glass obtained in the first step by cooling the glass melt to 680° C. was maintained for 8 hours at this temperature in the atmosphere to precipitate microcrystallites of $CdS_xSe_{1-x-y}Te_y$ ($0<y<1$, $0<x+y<1$) in the matrix. (Second step)

The glass after the second step was annealed to room temperature to obtain a glass doped with dispersed microcrystallites of $CdS_xSe_{1-x-y}Te_y$.

The glass was measured for the size of the $CdS_xSe_{1-x-y}Te_y$ microcrystallites dispersed in the matrix in the same manner as in Example 1. The average particle diameter of $CdS_xSe_{1-x-y}Te_y$ microcrysallites was about 60 angstroms.

Figure 3:
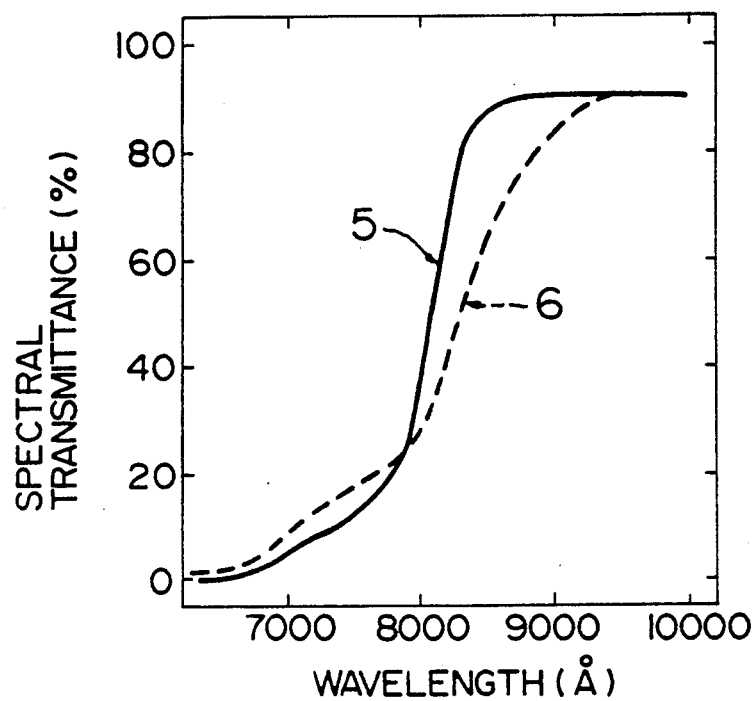
FIG. 3 is a graph showing the spectral transmittance curves of the glasses doped with dispersed $CdS_xSe_{1-x-y}Te_y$ microcrystallites, obtained in Example 5 and Comparative Example 2.

The glass was also measured for spectral transmittance in the same manner as in Example 1. The spectral transmittance, as shown by the solid line 5 of FIG. 3, was sharp in the rise and small in the transitional interval. Accordingly, the glass was confirmed to have an excellent spectral property as a material for infrared-transmitting filter.

Figure 4:
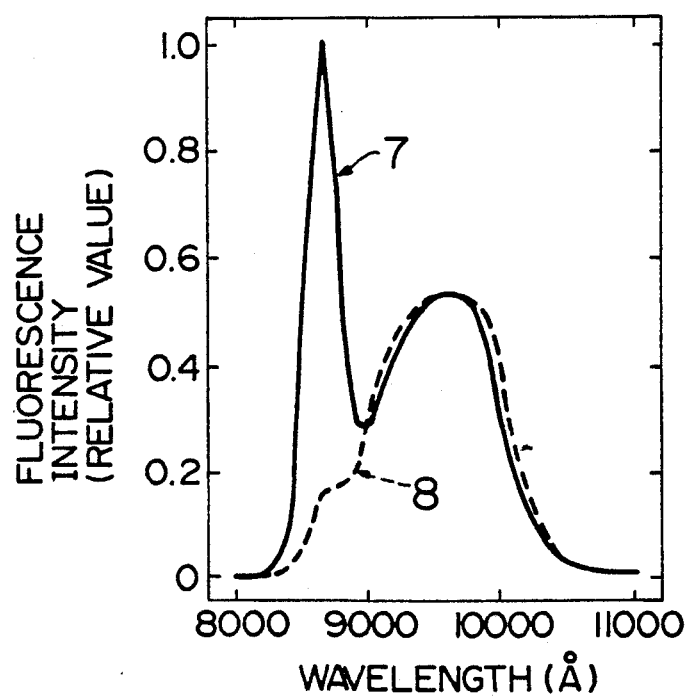
FIG. 4 is a graph showing the fluorescence spectral intensities seen when the glasses doped with dispersed $CdS_xSe_{1-x-y}Te_y$ microcrystallites, obtained in Example 5 and Comparative Example 2 were irradiated with an argon laser beam having a wavelength of 4,880 angstroms.

The glass was also measured for fluorescence spectral intensity in the same manner as in Example 1. The fluorescence intensity, as shown by the solid line 7 of FIG. 4, was very large at a wavelength of about 8,700 angstroms. Accordingly, the glass was confirmed to have an excellent optical nonlinearity.

COMPARATIVE EXAMPLE 2

A glass melt was obtained in the same manner as in Example 5. The glass melt was casted on a steel plate maintained at room temperature to cool it.

The resulting glass was heated from room temperature to 680° C. in 5 minutes in the atmosphere, maintained at this temperature for 8 hours to precipitate $CdS_xSe_{1-x-y}Te_y$ microcrystallites, and annealed to room temperature to obtain a glass doped with dispersed microcrystallites of $CdS_xSe_{1-x-y}Te_y$.

The glass was measured for spectral transmittance in the same manner as in Example 5. The spectral transmittance, as shown by the broken line 6 of FIG. 3, was mild (not sharp) in the rise and large in the transitional interval, as compared with the spectral transmittance of the glass doped with dispersed microcrystallites of $CdS_xSe_{1-x-y}Te_y$, obtained in Example 5.

The glass was also measured for fluorescence spectral intensity in the same manner as in Example 5. The fluorescence intensity, as shown by the broken line 8 of FIG. 4, was very small at a wavelength of about 8,700 angstroms, as compared with the fluorescence intensity of the glass doped with dispersed microcrystallites of $CdS_xSe_{1-x-y}Te_y$, obtained in Example 5.

EXAMPLES 6-8

Three glasses each doped with dispersed microcrystallites of $CdS_xSe_{1-x-y}Te_y$ were obtained in the same manner as in Example 5 except that the steel plate temperature in the first step and the maintenance temperature in the second step were changed to 640° C. and 2 hours (Example 6), 660° C. and 8 hours (Example 7), and 700° C. and 2 hours (Example 8).

Each glass was measured for the size of $CdS_xSe_{1-x-y}Te_y$ microcrystallites dispersed in the matrix, in the same manner as in Example 5. The average particle diameter of $CdS_xSe_{1-x-y}Te_y$ was 35 angstroms in the glass of Example 6, 50 angstroms in the glass of Example 7 and 70 angstroms in the glass of Example 8.

Each glass was also measured for spectral transmittance and fluorescence spectral intensity in the same manner as in Example 5. The results were the same as in Example 5, and each glass was confirmed to have an excellent spectral property as a material for infrared-transmitting filter and also an excellent optical nonlinearity.

EXAMPLE 9

A glass doped with dispersed microcrystallites of $CdS_xSe_{1-x}$, having a thickness of 0.5 mm was obtained in the same manner as in Example 1 except that the cooling of glass melt was effected by quenching the same glass melt as in Example 1 at a cooling rate of 30° C./sec with drawing by a twin-roller quenching process. The surface of the glass showed no flaw by visual observation and was optically smooth.

The glass was measured for the size of the $CdS_xSe_{1-x}$ microcrystallites dispersed in the matrix, in the same manner as in Example 1. The average particle diameter of $CdS_xSe_{1-x}$ microcrystallites was 60 angstroms.

The glass was also measured for spectral transmittance and fluorescence spectral intensity in the same manner as in Example 1 except that no optical polishing of glass surface was effected. The results were the same as in Example 1. Accordingly, the glass was confirmed to have an excellent spectral property as a material for sharp cut filter and also an excellent optical nonlinearity.

EXAMPLE 10

A glass doped with dispersed microcrystallites of $CdS_xSe_{1-x-y}Te_y$, having a thickness of 0.5 mm was obtained in the same manner as in Example 5 except that the cooling of glass melt was effected by pressing the same glass melt as in Example 5 with plates of 680° C. to quench the melt to 680° C. The surface of the glass showed no flaw by visual observation and was optically smooth.

The glass was measured for the size of the $CdS_xSe_{1-x-y}Te_y$ microcrystallites dispersed in the matrix, in the same manner as in Example 5. The average particle diameter of $CdS_xSe_{1-x-y}Te_y$ microcrystallites was 60 angstroms.

The glass was also measured for spectral transmittance and fluorescence spectral intensity in the same manner as in Example 5 except that no optical polishing of glass surface was effected. The results were the same as in Example 5. Accordingly, the glass was confirmed to have an excellent spectral property as a material for infrared-transmitting filter and also a excellent optical nonlinearity.

In Table 1 were shown the maintenance temperature (temperature T) and maintenance time adopted in the second step of each of Examples 1-10, as well as the average particle diameter of the dispersed microcrystallites in the glass of each of Examples 1-10.

In Examples 1-10, the cooling of glass melt in the first step was effected by a casting process, a twin-roller quenching process or a press quenching process. The cooling of glass melt may also be effected by cooling a glass melt still being held in the heat-resistant vessel used for preparation of the glass melt, to a temperature T which is not higher than the flow point of the glass but not lower than the sag point of the glass. Also, the preparation of the glass melt, the first step, the second step, and the annealing of the resulting glass doped with dispersed microcrystallites to room temperature may be effected not only by the crucible melting process but also by a continuous melting process or other process.

As described above, according to the present invention there can be obtained a glass doped with microcrystallites, showing an excellent spectral property as a material for sharp cut filter or infrared-transmitting filter even when made into a thin material and also showing a good nonlinear property as a nonlinear optical material.

Therefore, by effecting the present invention, there can be obtained not only sharp cut filters or infrared-transmitting filters both having an excellent spectral property, but also nonlinear optical parts having a good nonlinear optical property.

What is claimed is:

1. A process for producing a glass doped with dispersed microcrystallites selected from the group consisting of $CdS_xSe_{1-x}(0<x<1)$ and $CdS_xSe_{1-(x+y)}Te_y(0<x<1, 0<y<1, 0<x+y<1)$, which comprises:

(1) cooling a glass melt comprising a component to become a glass matrix and a component to become microcrystallites dispersed in said matrix, to a temperature T which is not higher than the temperature at which the viscosity of the glass is $4\times 10^7$ poises and not lower than $1.0\times 10^{11}$, the sag point of the glass, and (2) maintaining the cooled glass at the temperature T to precipitate microcrystallites in the matrix.

2. A process according to claim 1, wherein the starting material for the glass matrix is selected from neutral or reducing compounds.

3. A process according to claim 2, wherein said neutral or reducing compound is selected from oxides, carbonates, acetates, hydroxides and glasses.

4. A process according to claim 1, wherein the starting material for the microcrystallites are metals or metal compounds selected from Cd, S, Se, Te, CdS, CdSe and CdTe which, when melted, dissolve in the form of ions in the glass melt.

5. A process according to claim 1, wherein in the first step, the glass melt is quenched to the temperature T at a high rate of at least about 10° C./sec.

6. A process according to claim 5, wherein the quenching is conducted with drawing by a process selected from a twin-roller quenching process, a single-roller quenching process, a press quenching process, a float process and a lift process.

7. A process according to claim 1, wherein the time for maintaining the cooled glass at the temperature T is 5 minutes to 120 hours.

8. A process according to claim 2, wherein the atmosphere for glass melting is a neutral or reducing atmosphere.

TABLE 1

|  | Examples | | | | | | | | | |
| --- | --- | --- | --- | --- | --- | --- | --- | --- | --- | --- |
|  | 1 | 2 | 3 | 4 | 5 | 6 | 7 | 8 | 9 | 10 |
| Maintenance temperature (°C.) | 720 | 640 | 660 | 680 | 680 | 640 | 660 | 700 | 720 | 680 |
| Maintenance time (hr) | 2 | 2 | 2 | 16 | 8 | 2 | 8 | 2 | 2 | 8 |
| Average particle diameter (angstroms) | 60 | 30 | 40 | 45 | 60 | 35 | 50 | 70 | 60 | 60 |